M. KELLY.
Improvement in Earth Scrapers.

No. 125,199. Patented April 2, 1872.

Witnesses:
John Becker
Geo. W. Mabee

Inventor:
M. Kelly
Per Munn & Co
Attorneys.

125,199

UNITED STATES PATENT OFFICE.

MICHAEL KELLY, OF FAIRFIELD, VERMONT.

IMPROVEMENT IN EARTH-SCRAPERS.

Specification forming part of Letters Patent No. 125,199, dated April 2, 1872.

Specification describing a new and Improved Earth-Scraper, invented by MICHAEL KELLY, of Fairfield, in the county of Franklin and State of Vermont.

Figure 1:
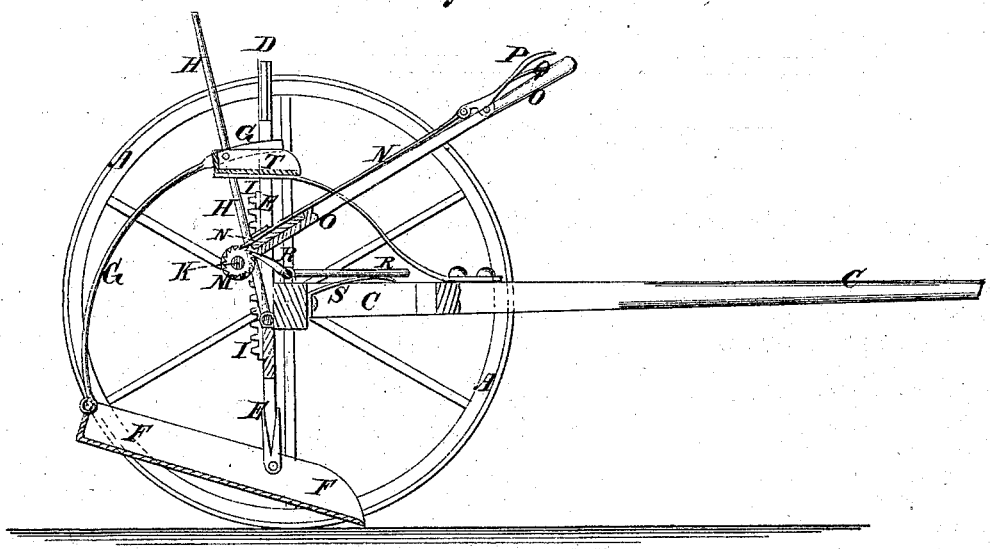
Figure 2:
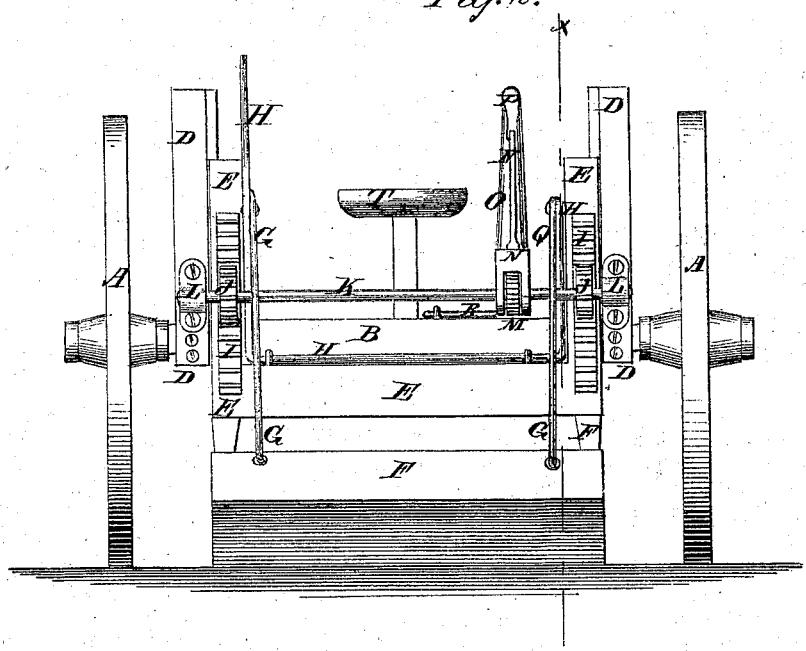

Figure 1 is a detail longitudinal section of my improved scraper taken through the line $x\ x$, Fig. 2. Fig. 2 is a rear view of the same.

Similar letters of reference indicate corresponding parts.

My invention has for its object to furnish an improved earth-scraper for grading, road-making, &c., which shall be simple in construction, convenient in use, and effective in operation, enabling more work to be done with less labor to man and team than when an ordinary scraper is used; and it consists in the construction and combination of the various parts of the machine, as hereinafter more fully described.

A are the wheels, which revolve upon the journals of the axle B, to which the tongue C is rigidly attached. To the rear side of the axle B, near its ends, are securely and rigidly attached two uprights, D, the inner edges of which are tongued or grooved to adapt them to serve as ways for the grooved or tongued edges of the frame or gate E in its upward and downward movements. The lower ends of the side bars of the gate or frame E are pivoted to the side flanges of the scraper F near their forward ends. To the rear flange of the scraper F, near its ends, are pivoted the lower ends of the curved rods or bars G, which curve upward and forward, and are pivoted to the ends of the rod or bar H, which is bent twice at right angles, and the middle or horizontal part of which is pivoted to the cross-bar of the frame or gate E. The end of one or both the rods G project in front of the rod H, and is bent at right angles to strike against the forward side of the side bars of the gate or frame E, to support the rear end of the scraper F when in working position, and when being raised and lowered. The left end of the rod H projects above the rod G, as shown in Figs. 1 and 2, to serve as a lever for raising the rear end of the scraper to dump the load. To the rear sides of the side bars of the gate or frame E are attached rack-bars I, the teeth of which mesh into the teeth of the gear-wheels J attached to the shaft K, the ends of which revolve in bearings L attached to the rear side of the uprights D. To the shaft K, near its right hand end, is attached a ratchet-wheel, M, upon the teeth of which the pawl N takes hold. The pawl N extends along and is connected with the lever O, and to its upper end is pivoted the end of a short lever, P, which is pivoted to the said lever O, so that by pressing the free end of the lever P toward the lever O the pawl N will be withdrawn from the ratchet-wheel M, allowing the shaft K to revolve freely, so that the scraper may drop to the ground by its own weight. The free end of the lever P is held out from the lever O, to hold the engaging end of the pawl M in contact with the teeth of the ratchet-wheel M by a spring, Q, as shown in Fig. 1. The lower end of the lever O is pivoted to and rides upon the shaft K. R is a lever-pawl, one end of which is so arranged as to bear against the teeth of the ratchet-wheel M and hold the shaft K securely while the lever O is moved back to take a new hold. The other end of the lever-pawl R projects into such a position, that it may be conveniently reacted and operated by the driver with his foot. The free end of the lever-pawl R is held up, holding its engaging end against the teeth of the ratchet-wheel M, by a spring, S, as shown in Fig. 1. T is the driver's seat, which is supported from the axle B or tongue C, as may be convenient. By this construction the scraper F is raised, either when empty or loaded, for convenience in passing from place to place, by simply working the lever O backward and forward. The scraper F is lowered into working position by pressing down the free end of the lever R with the foot and the free end of the lever P with the hand. The scraper F is dumped by drawing the projecting upper end of the rod or lever H forward.

Having thus described my invention, I claim as new and desire to secure by Letters Patent—

The combination of the uprights D, gate or frame E, scraper F, rods G and H, racks I, gear-wheels J, shaft K, ratchet-wheel M, pawl N P Q, lever O and lever-pawl R S with each other and with the axle B, wheels A, and tongue C, substantially as herein shown and described, and for the purpose set forth.

MICHAEL KELLY.

Witnesses:
F. W. McGETTRICK,
E. A. SOWLES.